(12) United States Patent
Peters et al.

(10) Patent No.: US 6,999,937 B1
(45) Date of Patent: Feb. 14, 2006

(54) SYSTEM FOR PREDEFINING VIA AN ACTIVITY SCHEDULER FIRST TYPES OF ENTERED DATA THAT ARE PROCESSED BY AN ACTIVITY PROCESSOR IN REAL TIME AND SECOND TYPES OF ENTERED DATA THAT ARE QUEUED FOR PROCESSING AT ANOTHER TIME

(75) Inventors: Gerald Peters, Kiowa, CO (US); Jon Sykes, Glenview, IL (US); Arthur Pennington, Buffalo Grove, IL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/553,877

(22) Filed: Apr. 20, 2000

Related U.S. Application Data

(63) Continuation-in-part of application No. 08/673,647, filed on Jun. 25, 1996, now Pat. No. 6,714,914, which is a continuation of application No. 08/285,501, filed on Aug. 3, 1994, now abandoned, which is a continuation-in-part of application No. 07/813,151, filed on Dec. 23, 1991, now abandoned.

(51) Int. Cl.
*G06F 17/60* (2006.01)
(52) U.S. Cl. .............................. 705/8; 705/4; 718/101
(58) Field of Classification Search ............... 705/2–3, 705/4, 7–9; 718/101; 707/104.1; 709/101, 709/201
See application file for complete search history.

(56) References Cited

U.S. PATENT DOCUMENTS

| | | | |
|---|---|---|---|
| 4,359,631 A | 11/1982 | Lockwood et al. | ......... 235/381 |
| 4,491,725 A | 1/1985 | Pritchard | |
| 4,553,206 A | 11/1985 | Smutek et al. | .............. 707/101 |
| 4,648,037 A | 3/1987 | Valentino | |
| 4,774,664 A * | 9/1988 | Campbell et al. | ............. 705/38 |
| 4,775,935 A | 10/1988 | Yourick | ...................... 345/811 |
| 4,827,404 A | 5/1989 | Barstow et al. | ............... 703/20 |
| 4,831,526 A | 5/1989 | Luchs et al. | .................... 705/4 |
| 4,833,312 A * | 5/1989 | Minematsu et al. | ......... 235/379 |
| 4,837,693 A | 6/1989 | Schotz | |
| 4,878,175 A | 10/1989 | Norden-Paul et al. | |
| 4,899,292 A | 2/1990 | Montagna et al. | ....... 707/104.1 |
| 4,916,611 A * | 4/1990 | Doyle et al. | ................... 705/2 |

(Continued)

FOREIGN PATENT DOCUMENTS

EP      1164502 A2 *   12/2001

(Continued)

OTHER PUBLICATIONS

Peoplesoft extends lead in HRMS Market; demonstrates new applications, enterprise-scale performance, global implementation capability at IHRIM, Business Wire, Jun. 10, 1996, File 810 #0593233.*

(Continued)

*Primary Examiner*—Joseph Thomas
*Assistant Examiner*—Carolyn Bleck

(57) ABSTRACT

An integrated system for the administration of insurance companies is disclosed which includes a personal computer, a network and one or more file servers. The system further includes software for performing a plurality of functions which are interconnected and automatic. Manually entered data is verified, integrated into the database and the appropriate functions performed. A built-in audit system allows all transactions to be retrieved and all communications to be documented. A system allows for predefining via an activity scheduler first types of entered data that are processed by an activity processor in real time and second types of entered data that are queued for processing at another time.

12 Claims, 5 Drawing Sheets

U.S. PATENT DOCUMENTS

| | | | | |
|---|---|---|---|---|
| 4,974,160 A | | 11/1990 | Bone et al. | 345/751 |
| 4,975,840 A | * | 12/1990 | DeTore et al. | 705/4 |
| 4,992,940 A | | 2/1991 | Dworkin | 705/26 |
| 5,006,983 A | * | 4/1991 | Wayne et al. | 705/8 |
| 5,070,452 A | * | 12/1991 | Doyle et al. | 705/2 |
| 5,117,354 A | * | 5/1992 | Long et al. | 705/27 |
| 5,136,502 A | | 8/1992 | Van Remortel et al. | 705/2 |
| 5,182,705 A | * | 1/1993 | Barr et al. | 705/11 |
| 5,183,705 A | * | 2/1993 | Birkholz et al. | 705/11 |
| 5,191,522 A | * | 3/1993 | Bosco et al. | 705/4 |
| 5,202,827 A | * | 4/1993 | Sober | 705/36 |
| 5,212,634 A | * | 5/1993 | Washizaki et al. | 700/90 |
| 5,241,464 A | | 8/1993 | Greulich et al. | 705/26 |
| 5,301,105 A | * | 4/1994 | Cummings, Jr. | 705/2 |
| 5,319,543 A | * | 6/1994 | Wilhelm | 705/3 |
| 5,432,904 A | * | 7/1995 | Wong | 705/4 |
| 5,475,833 A | * | 12/1995 | Dauerer et al. | 707/201 |
| 5,493,490 A | * | 2/1996 | Johnson | 705/26 |
| 5,523,942 A | * | 6/1996 | Tyler et al. | 705/4 |
| 5,535,322 A | | 7/1996 | Hecht | 705/1 |
| 5,557,515 A | * | 9/1996 | Abbruzzese et al. | 705/9 |
| 5,596,750 A | * | 1/1997 | Li et al. | 709/101 |
| 5,721,913 A | * | 2/1998 | Ackroff et al. | 707/103 R |
| 5,737,539 A | * | 4/1998 | Edelson et al. | 705/3 |
| 5,826,020 A | * | 10/1998 | Randell | 709/202 |
| 5,848,271 A | * | 12/1998 | Caruso et al. | 712/220 |
| 5,862,322 A | * | 1/1999 | Anglin et al. | 714/57 |
| 5,890,130 A | * | 3/1999 | Cox et al. | 705/7 |
| 5,903,873 A | * | 5/1999 | Peterson et al. | 705/4 |
| 5,991,733 A | * | 11/1999 | Aleia et al. | 705/8 |
| 6,442,533 B1 | * | 8/2002 | Hinkle | 705/35 |
| 6,714,914 B1 | * | 3/2004 | Peters et al. | 705/4 |

FOREIGN PATENT DOCUMENTS

| | | | |
|---|---|---|---|
| WO | WO 3005154 A2 | * | 1/2003 |
| WO | WO 3005164 A2 | * | 1/2003 |

OTHER PUBLICATIONS

Datapro Research Group, "Insurance and Real Estate," McGraw-Hill, Inc., 1991, pp. D45-150 to D45-900.

Datasources Software, "Insurance Applications Software," 1st Ed., 1990, pp. J-391 to J-404.

* cited by examiner

SYSTEM FOR PREDEFINING VIA AN ACTIVITY SCHEDULER FIRST TYPES OF ENTERED DATA THAT ARE PROCESSED BY AN ACTIVITY PROCESSOR IN REAL TIME AND SECOND TYPES OF ENTERED DATA THAT ARE QUEUED FOR PROCESSING AT ANOTHER TIME

CROSS REFERENCE TO RELATED APPLICATIONS

This application is a continuation in part of U.S. patent application Ser. No. 08/673,647 now issued as U.S. Pat. No. 6,714,914, which is a continuation of application Ser. No. 08/285,501, filed on Aug. 3, 1994, now abandoned, which is a continuation-in-part of application Ser. No. 07/813,151, filed on Dec. 23, 1991, now abandoned. The disclosure of U.S. patent application Ser. No. 08/673,647 is hereby incorporated herein by reference.

BACKGROUND OF THE INVENTION

The present invention is generally related to computer software, and in particular, concerns a personal computer-based system for companies with networked computer systems.

Several large mainframe software systems for the life insurance industry have been developed over the last twenty years. The foundation for most of these systems is IBM's original 1962 CFO product. The first generation of products was written in AUTOCODER and was designed for a computer with 16 k of memory. The second generation of products was a CFO replacement system again directly descended from the original CFO product but written mostly in ASSEMBLER language. The third generation of life insurance software was mainframe database systems. These systems were all large mainframe databases, some of which were relational, written primarily in COBOL, with most components being taken from earlier systems. The fourth generation systems are mini and PC based mainframe replacement systems. Again these systems are written in COBOL, still using the single centralized processor concept. Some are transportable between PC's, mini-computers and mainframes.

The first through fourth generation software systems for life insurance companies still use technology with disjointed data files, outdated mainframe architecture, restrictive data formats and difficult programming languages. The deficiencies are particularly onerous in view of increased competition in the insurance industry. Competitive shifts and opportunities in the marketplace are characterized by a need for rapid, competent adjustments in product support services, compensation systems and customized administrative support. In addition, increasing government regulation and reporting have been relentless in recent years and require sophisticated computer system enhancements. Another problem is a shortage of qualified computer programmers. Of even greater importance, the shorter product lead times and life cycles in the insurance industry now require products to be implemented more quickly.

In addition to these problems the data processing departments of insurance companies are being asked to provide wider and easier access to the corporate database, in order to provide the users with the necessary data to administer products and provide prompt customer service. At the same time cost must be kept within acceptable levels.

Accordingly, it is an object of the present invention to provide an integrated system for the administration of an insurance company at a reasonable cost. This integrated system must reduce total data processing costs, reduce product implementation time frames, be easy to use and provide greater flexibility in product design and commission payment frequency and format.

SUMMARY OF THE INVENTION

The present invention is an integrated system for the administration of insurance companies. The system includes a plurality of personal computers, a network and one or more file servers. The system further includes software for performing a plurality of functions, the functions including new business processing, policy administration, correspondence, cashiering and disbursement processing, accounting, billing and payment processing, requirement processing, marketing and sales information and maintenance of all subsidiary files. Data files are provided for storing current information characterizing each of these functions. The system is written in a fifth generation language which takes advantage of PC/network distributed environments, utilizing a true relational database design. Manual entry devices such as keyboards allow entry of data relative to these functions. The program receives data and verifies its accuracy. The program then takes the entered and received data, performs the functions enumerated above and updates the data files. The system further includes various devices such as a printer, built-in fax and modems for communicating the updated information to other computers or to external printers, fax machines or other computers outside the network.

The system also provides off-site database support. This support allows a company to process data in one or more locations while maintaining a single consolidated database. This support is well suited for remote, regional processing by separate marketing organizations, or regional processing offices of the company. This support can take one of three forms: (1) selected data files are maintained in their entirety at the remote site, thus allowing both the Home Office and the remote site to view and update any records in these files; (2) a subset of selected data files are maintained at a remote site such that only the subset can be maintained by the remote site but all data including the subset can be maintained by the Home Office; or (3) a subset of selected data files at the Home Office is made available to the remote site for inquiry purposes only. Updating of the multiple data files can be done through a dedicated phone line, or on a periodic batch basis if appropriate.

An additional feature of the invention is the system for installing the program in individual insurance companies. The system comprises an interface which poses a series of questions to the user upon installation. The questions generally are of the yes or no or multiple choice variety. Based on the answers to the questions, the system is globally modified to conform to these answers. The parameters of the system are thereby modified independently or collectively as required. In a preferred embodiment the system is subdivided into four levels. The database level basically includes all information stored in the computer. The company level divides the database into information concerning a particular company or group of companies. The product line level concerns groups, such as factor based products like traditional life insurance, formula based products such as universal life and fixed annuities and equity-based products such as variable life and variable annuities. The product level is only concerned with specific products, such as a specific type of whole life insurance. By entering the required data the user can profile the parameters of the database, the number and type of companies, the relevant product lines and the specific products of the user.

The invention provides various advantages, including, but not limited to, the following:

a) Various different insurance products are supported, and can be accessed by various different insurance agents or insurance agencies.

b) A PC local area network is employed, providing distributed processing for faster speed, yet providing distributed access to a database on a file server.

c) Reverse processing is accommodated, whereby any transaction can be reversed, including reducing an agent's commission when a transaction is reversed. A previous incorrect transaction can be reached and corrected.

d) Policy records are placed in and stay on the system from before application is submitted through while benefits are being paid.

e) Applications for insurance are submitted online with screens that vary depending upon the insurance product. There is no need to mail an application. Paperwork is reduced, and a more environment friendly system is provided.

f) An agent hierarchy is established for each client company. The system keeps an electronic record of who an agent reports to and who reports to the agent, which hierarchy can change for different products.

g) The system can calculate commissions depending on level of the agent in the hierarchy. The frequency of making commission payments is variable. It is possible to cause a commission to be paid prior to the scheduled payment date, and the system can be instructed to advance commissions when applications are submitted.

h) The system calculates tax information, and prints a form 1099 for each agent or agency that received commission payments.

i) Information for each agent stored, and information relating to an agent can be retrieved by performing a phonetic search of the agent's name.

j) The system provides the capability of generating a form of instructions regarding what labwork is required, and of storing lab results on-line for an underwriter to view. There is no need to mail medical results.

k) The system can be used to determine the maximum amount that can be borrowed from a policy, and to generate a loan check and letter to a policy owner who wishes to borrow against a policy.

l) A request can be made to the system to pay systematic withdrawals to a policy owner, and the system will do so. Federal and state taxes are withheld, and letter is generated by the system to accompany a check.

m) The system calculates a minimum distribution amount for tax purposes for owners of IRA's, Terminal Funded or TSA policies, who are at least 70½ years old.

n) The system generates form letters, such as a letter to a policy owner prior to maturity of the policy.

o) The system generates transaction files for transmittal to automated clearing house for premium payments.

p) The system provides mail tracking. Letters are scanned in and maintained in the system for later review on-line.

DESCRIPTION OF THE DRAWINGS

FIGS. 2a, 2b and 2c of the drawings are flow chart illustrating screen options displayed during profiling of the system, and the relationship between the various options. It is to be understood that while certain terms included in FIGS. 2a, 2b and 2c may not easily be understood by a lay person, they will be clearly understood by a person of ordinary skill in the insurance industry.

DETAILED DESCRIPTION OF THE PREFERRED EMBODIMENT

While the invention is susceptible of embodiment in many different forms, there are shown the drawings and will herein be described in detail several specific embodiments with the understanding that the invention is not limited thereto except insofar as those who have the disclosure before them are able to make modifications and variations therein without departing from the scope of the invention.

Figure 1:
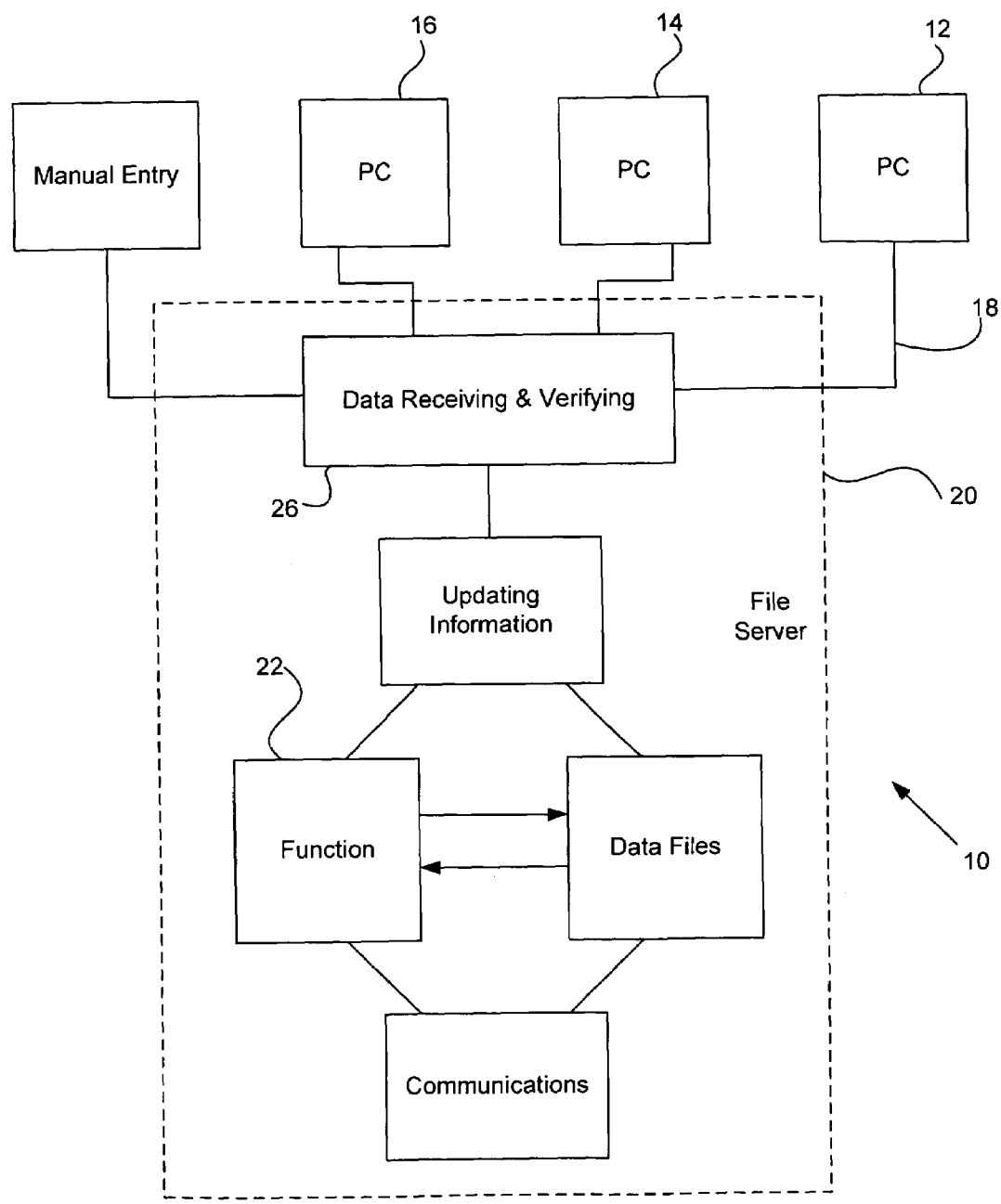
FIG. 1 of the drawings is a flow chart generally illustrating the operation of the system.

As illustrated in FIG. 1 of the drawings, an integrated system 10 for the administration of insurance companies is disclosed. The system 10 includes a plurality of personal computers 12, 14 and 16, a network 18, and one or more file servers 20. The system 10 further includes a mechanism 22 for performing a plurality of functions in a distributed processing environment. These functions include Mail Tracking, Cashiering, Disbursement Clearing, Requirements Processing, Document Processing, Script Processing, Field Underwriting, Billing, Executive Information, Marketing and Sales Information, Tax Reporting, Vendor Interfacing, Database Management, and Agent.

Processing. These functions are profiled (defined below) in a functional profile which is described below.

A feature of the invention is that the system includes a user interface which, in the illustrated interface includes one of the personal computers 12, 14 and 16, and which is for setting up the system when it is first installed at an individual insurance company, and when it is desired to modify the system (profiling). In profiling, the user interface generates and displays a series of questions to the user and receives answers from the user, and automatically modifies the system based on the series of question and answers. These questions usually take the form of yes and no or multiple choice questions which are answered by making a selection from a menu. By answering these questions through a manual entry mechanism such as a keyboard, the system is globally modified to conform to these answers. [For example, when the interface asks the name of the company, and the company name is entered, all correspondence, communications and data entered will be entitled with this company name. If additional companies are specified, then the system will be globally modified to ask to which company the answers being entered refer. When information is sought on a specific company, inquiries will be directed to the specific company requested.] Profiling is also used, for example, to define a new insurance product.

Figure 2A:
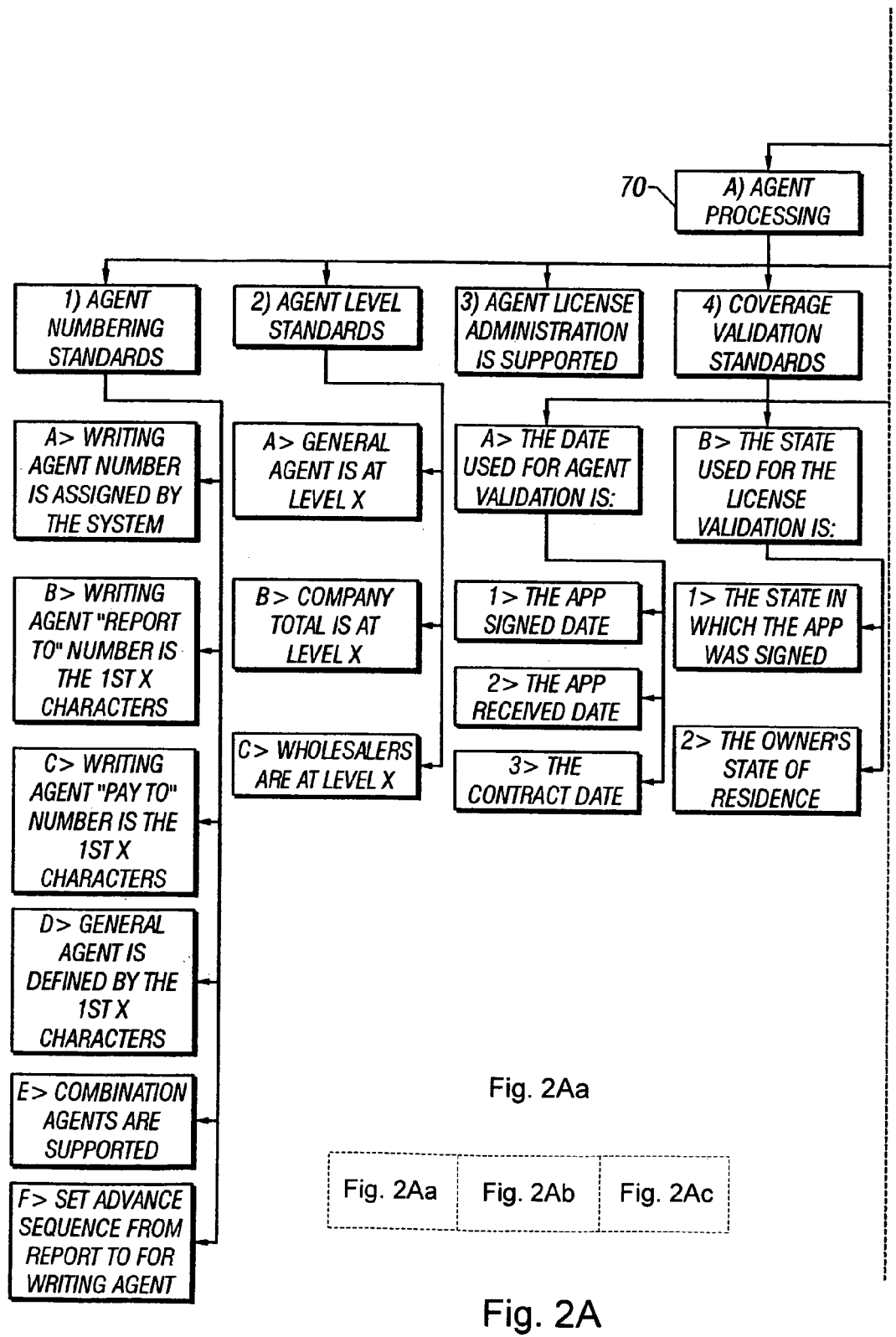

This profiling is performed through menu selections which are illustrated in FIGS. 2A 2B and 2C. Each horizontal row in FIGS. 2A, 2B and 2C represents a menu "level". Any particular block, or menu selection, illustrated in FIGS. 2A 2B and 2C can be reached by making an appropriate selection from a connected block at a higher level or horizontal row.

Each menu involves one or more parameters which may be selectively modified by the user. The user interface is constructed and arranged to modify these parameters at the command of the user and thereby independently or collectively change that parameter for as many levels as required.

The system is divided into four general exemplary profiles: company profile shown at FIG. 2a, a product line profile shown at FIG. 2b and a functional profile shown in FIG. 2c.

As seen in FIG. 2a, in the company profile, questions which the user interface poses to the user relate to, for example, agent processing 70 (how to assign an agent number to an agent, agent license administration, etc.), and policy processing 72 (the number of digits in a policy number, when to accept a premium that is below the required amount, when to return a premium that is greater than the required amount).

In the product line profile, FIG. 2b, questions which the user interface poses to the user relate to, for example, commission topics 74, and policy administration topics 76.

In the functional profile, FIG. 2c, selections are made from various options to set up operation of (to profile) functions including mail tracking 78, cashiering 80, disbursements 82, and billing functions (not shown), requirements processing functions (not shown), document processing functions (not shown), billing functions (not shown), marketing and sales information functions (not shown), database management functions (not shown), agent processing functions 84, and names and addresses functions 86. In the functional profile, selections are made from various options to set up operation of (to profile) functions that will be described below.

In the Mail Tracking function, the system provides tracking of all received mail. Mail is opened and immediately logged into the system after it is received. A piece of mail, depending on the type of document it is, is assigned to a proper department in the company. This can be performed by assigning a unique sequence number to each piece of mail received, printing a label with the unique sequence number using a label maker included in the system, and attaching the label to the piece of mail. Alternatively, the piece of mail is scanned by a scanner included in the system, and is electronically attached to an appropriate record in the system. After mail has been entered into the system and categorized, each department can assign pieces of mail to a specific person within the department. This assigned piece of mail can be reviewed through online display screens by the specific person who can process the piece of mail by creating a transaction, changing policy and or agent data, or by creating a response to the piece of mail. After being processed by the specific person, the system closes the record relating to the piece of mail by attaching the mail record to the completed transaction. In this way, the piece of mail becomes part of the specific policy/agent record and the completed transaction and/or response. Mail records that haven't been closed can be monitored through online displays. These records are displayed by the system in the order of oldest to newest to indicate how much mail backlog exists. The system stores information relating to how and when the piece of mail is processed.

In the Cashiering, Disbursements, and Billing functions, all accounting is done immediately as transactions are processed. All incoming cash must be entered and balanced before it can be applied to individual policies. All disbursements, including checks, wire transfers, and internal exchanges, are controlled through an integrated approval feature. Suspense amounts are automatically kept in balance with ledger accounts.

In the Requirements Processing function, the system provides requirement processing for underwriting, enforce policy maintenance, and agent licensing. Follow-ups can be sent internally to a named individual or outside in document form. The interface to MIB is automatic and controlled by the system.

In the Document Processing function, the system can generate documents either automatically (form documents) or at the request of the user. These documents are written using Wordstar™ or Editext™ or other similar word processing system. The system provides address pattern selection, document sorting, mailing exceptions by policy, agent or general agent, and an automatic FAX interface. Each document can be viewed online at any time. Users can also log incoming documents, phone calls and miscellaneous notes.

In the Billing function, the system can handle any mode of premium from 1 day to multiple years. Multiple coverages and payments due are easily combined on one bill. The billing process creates a due file which is easily accessed for payment processing. Payments are also batch controlled.

In the Marketing and Sales Information function, three types of reporting capabilities are provided—traditional production information by agent and time period, pending reports, and remote agency reporting (through the maintenance of a remote database).

In the Database Management function, in the Audit History sub-function, all changes to policy and agent data are recorded immediately as changes occur. This data can be accessed online by date, policy, agent, name, file or field.

In the Agent Processing function, the system fully supports the licensing process with automatic requirement generation based on state requirements, including the printing of checks for state fees. Commissions are calculated immediately as transactions are processed. Pending commission amount and past commission statements are available online. Statements can be produced independently by agent at any frequency.

In the Names and Addresses function, the system allows an unlimited number of names to be associated with any policy or agent. Each name may have an unlimited number of addresses and phone numbers. Each name and address must be entered only once even though it may be associated with multiple policies or agents. An integrated zip code file is provided to streamline address processing and an intelligent name analyzer standardizes the maintenance of names.

Other features of the system will now be described.

Reversal processing is designed into the system, not added later as an afterthought. The system allows the immediate and simple reversal and reprocessing of any or all policy transactions, including the appropriate adjustments to accounting and commissions.

The system operates in 'people' time, or as the inventors call it, 'Business Time' processing. There is no typical overnight cycle where a master file is passed from beginning to end, searching for events that need to be processed. Instead, the system employs means referred to herein as the Activity Server/Activity Processor (ASAP).

ASAP includes an Activity Scheduler (one of 12, 14, and 16) which monitors and controls processing. ASAP also includes a plurality of Activity Processors which run programs on dedicated workstations (the remaining of 12, 14, and 16). ASAP is a unique feature that allows any workstation on the network to be assigned as an Activity Processor. ASAP reduces, and in some cases eliminates, the necessity for an operator to wait while real time processing takes place. As previously mentioned, ASAP also eliminates the need for batch overnight processing. Functions are generated as a result of both online activity and prescheduled processing. An Activity Record is created for each function and is added to the Activity File, in date and time sequence. Any function scheduled for a date and time less than the current date and time is selected for processing by the Activity Scheduler. Each function is processed as a separate little batch job in real-time. By employing ASAP, activities can be processed 24 hours per day and are totally independent of online transactions. All critical functions (validation, premium calculation, etc.) are performed immediately as online transactions. Functions such as policy page print, commission calculation, accounting, etc., are not performed while the operator waits. Instead, the Activity Scheduler schedules these activities to be processed at the next earliest convenience by a workstation (activity processor) dedicated to this purpose (much like a queuing process). These scheduled functions will generally be processed within a few minutes by the workstation (activity processor), making the data available for online access.

Not all functions result from online processing, many are inherent to the administration of an insurance contract. Some of these functions are policy anniversary, billing and commission statements. These types of functions are initially scheduled as a result of an online process. Thereafter, these functions are scheduled automatically by the Activity Scheduler, perpetually, until the policy or agent becomes inactive.

The system gives greater control of the entire process to the Users. Much more data is available immediately online and can be displayed in almost any order. Rate files, tables, and other user controlled data are all updated online.

Documents are designed by the users using Microsoft's Wordstar™ or Editext™ and are merged with the appropriate policy data from the system when letters are created. Any correspondence can be generated and printed immediately on a local printer. Reports are also easily developed that allow the User to select the range of data to be selected and the sequence of data to be displayed.

The system has been developed strictly for the PC/Network environment. It operates using Novell's NetWare operating software (Novell today is recognized as the defacto industry standard). The network allows several PC's to access the system at the same time, and facilitates communications between the PC's for other purposes. The use of the networked intelligent workstation allows true distributed processing and control. The concept of a centralized computer environment has never been particularly conducive to an effective operation. All processing and development needs CANNOT be reduced to a single priority list and still be efficient. The distributed environment allows major divisions and individual users to control their own destiny.

Figure 2A:
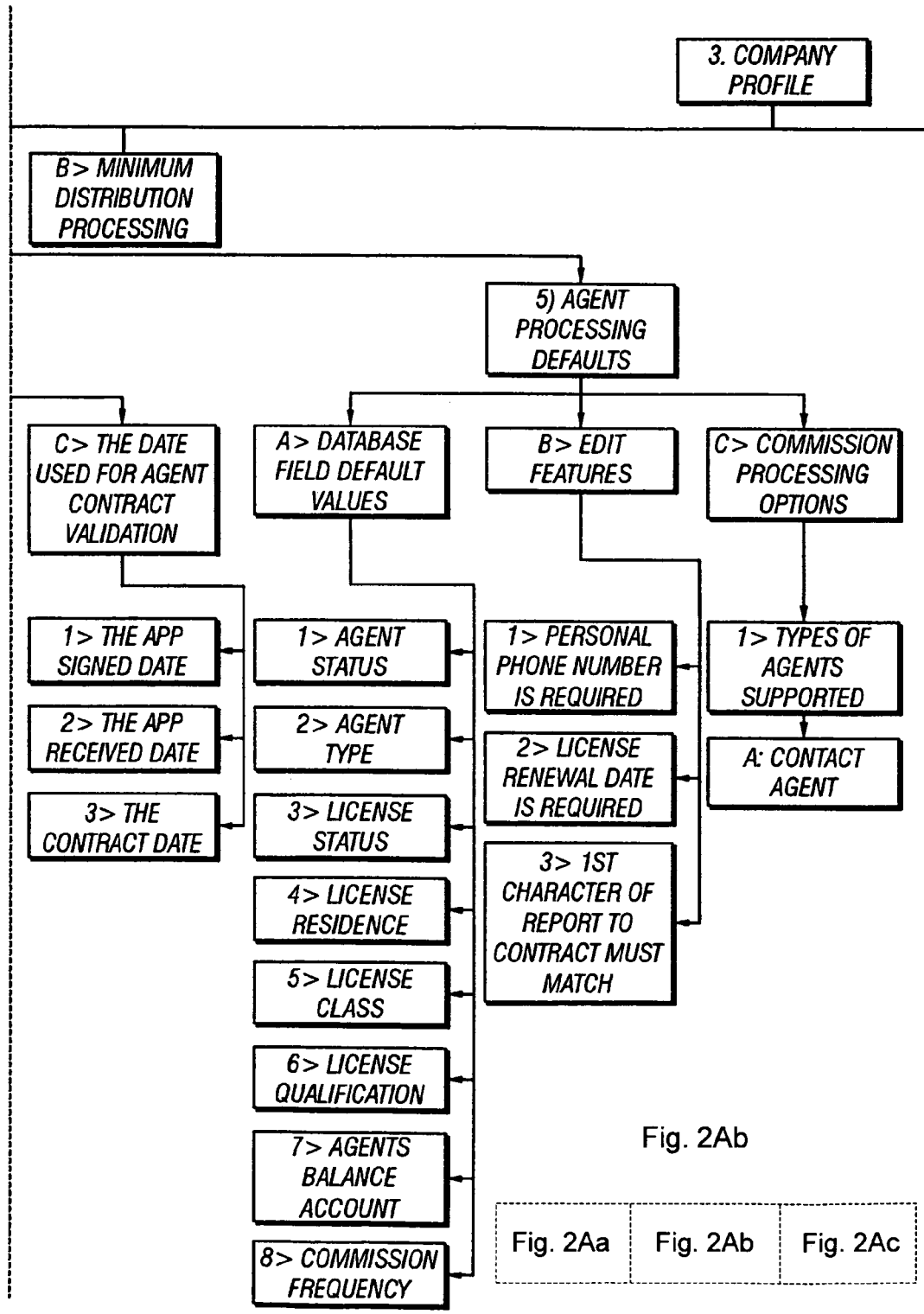
Figure 2A:
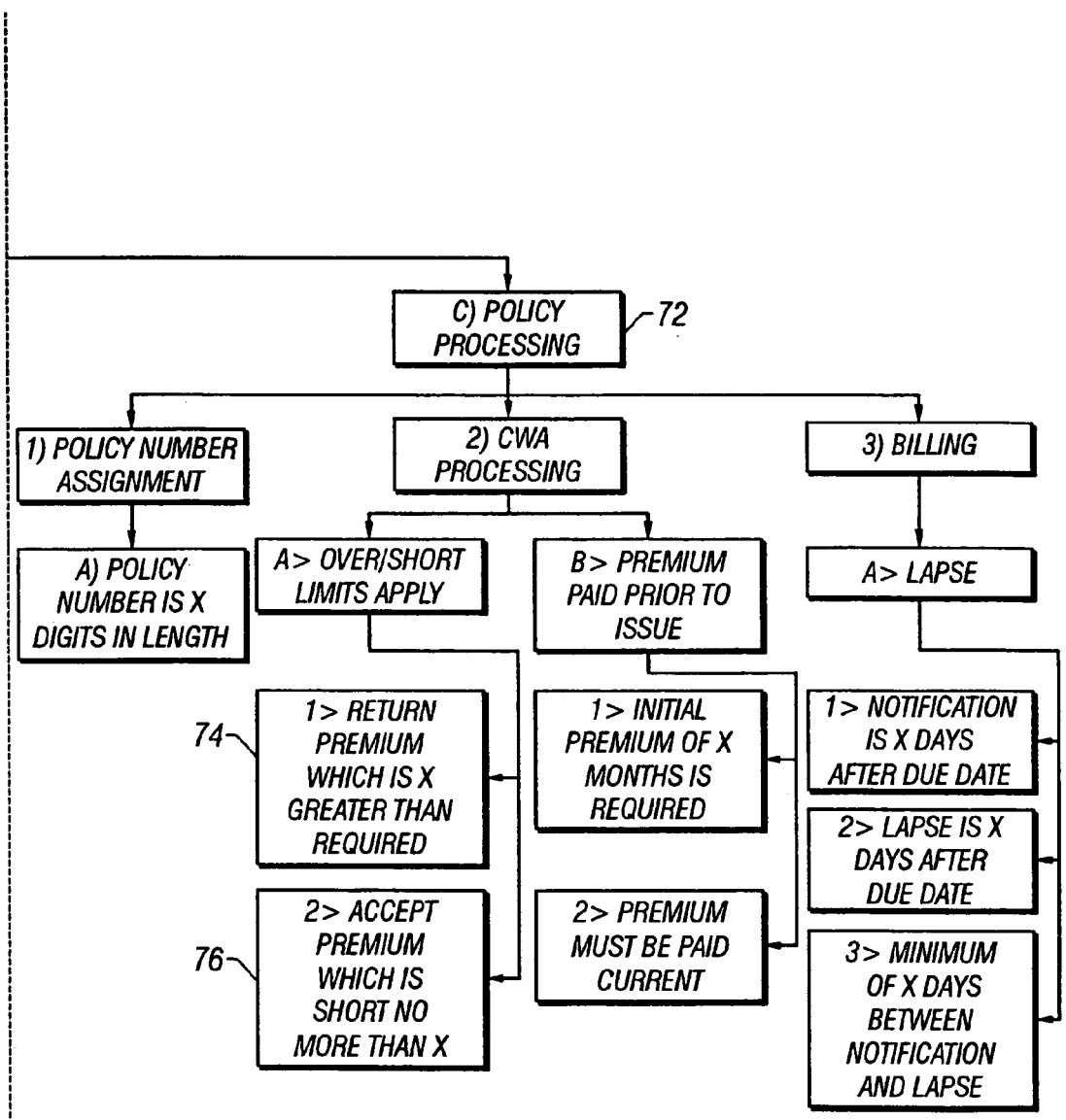

The system has been developed using a relatively new, powerful, commercially available development tool called MAGIC/PC™, which interfaces with data written into btreive™ files (btreive™ is another commercially available product). Various menus described above and illustrated in FIGS. 2A, 2B and 2, were invented using MAGIC/PC™ and those menus cannot be altered by the user of the system.

The information for these functions is stored in data files 24. A data receiving and verifying mechanism 26 which is built into the system, receives and verifies the data from each of the personal computers and the file server. In other words, the data receiving and verifying system checks the information received to insure that it corresponds in format and does not conflict with the existing data. Following such verification, the system utilized the information received to perform the function shown in FIGS. 2A, 2B and 2C. After performing these functions the current data relative to each of the functions is updated. A series of data files, which in a preferred embodiment now exceed three hundred files, store data characterizing each of the functions.

Figure 3:
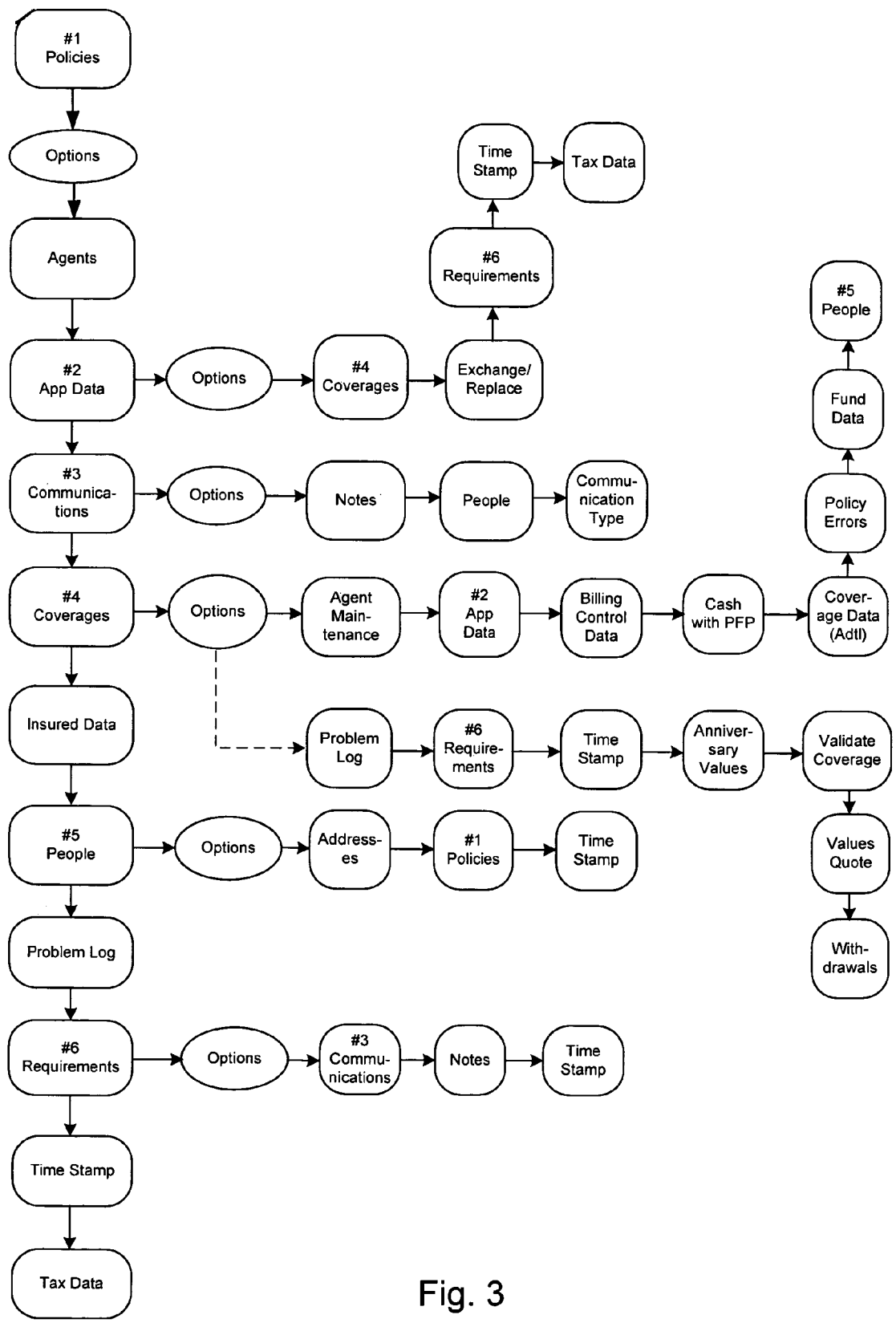
FIG. 3 of the drawings is a flow chart illustrating screen options displayed during actuation of the system, and the relationship between the various options.

As shown in FIG. 3 of the drawings, the functions enumerated above (when used as opposed to when being set up or profiled) are interconnected by the system and are sequential. Specifically, any inquiry concerning policies will cause the system to present, as one of the options, information on a particular agent or agents. Once the agent is identified, in the example shown, an inquiry concerning filing an application may be made. Thus, the option of an Application Data (#2) is selected. The option as to what Coverages are desired (#4) is then selected. The system will then ask the user whether this is an exchange or replacement for an existing policy. The Requirements #6 of the policy will then be examined and, once selected, will be Time Stamped and appropriate Tax Data will be sent to the appropriate state regulatory body. Under communications, (#3), once the application is entered, communications including Notes will be sent to the appropriate People and the appropriate Type of Communication will be sent (memo, letter, bill etc). Again, under Coverages (#4), once the appropriate coverage is selected, the Agent Maintenance function will determine the appropriate agent hierarchy and compensation for the agent(s) and how it is to be paid. Again, the Application Data (#2) is evaluated and sent to Billing Control. If cash is sent with the application to cover the entire cost, then obviously no bill is required. If any additional coverage data is required, that will be entered. If there any policy errors, those will be corrected and, if money is to go to a particular fund, that information will be entered. The appropriate data is then sent to the People function (#5). The People function (#5) receives information, as seen in the left hand column, from insured data. Under the People function, the appropriate addresses and names of the people who need to receive information on this policy are entered and the information is Time Stamped so that if changes are made later, then can be audited. The program and processing functions have been separated into ten logical groups which are displayed as menu items when first entering the system. These include policy administration, agent maintenance, reports, product files, document control, financial systems, activity processor, processor, database displays and the general information. When entering any menu item, subsequent subsystem and program menus are displayed which allow easy access to any desired function. Windows are inherent in the system and are easily displayed using function keys. Each database file has one or more access codes. Each menu has a two digit code associated with it (and displayed on screen when the menu is accessed), and each access code consists of a concatenation of the two digits codes of the menus passed through to access the database file. A concatenation of the two digit codes of the menus passed through on the way to an intermediate displayed menu appears on screen at the intermediate displayed menu. Each access code provides a pre-sorted index to values in the file. This feature allows the user to easily access data and insures that response time will be consistent regardless of the file size. This feature also allows the user to easily describe to someone else what menu he or she is at and how he or she got to that menu.

The system further includes a means providing for communication between the individual personal computers in the system and to individuals outside of the system. The communication mechanism comprises the Novell™ network connecting the PC's and the file server. In order to provide communication to individuals outside the network and outside the insurance company, the system is connected to one or more laser printers. In addition, the system may include electronic interfaces such as Carbon Copy™ and electronic fax systems such as those commonly known in the art.

The system also provides off-site database support. This support allows a company to process data in one or more locations while maintaining a single consolidated database. This support is well suited for remote, regional processing by separate marketing organizations, or regional processing offices of the company. Generally, this support can take one of three forms: (1) selected data files are maintained in their entirety at the remote site, thus allowing both the Home Office and the remote site to view and update any records in these files; (2) a subset of selected data files are maintained at a remote site such that only the subset can be maintained by the remote site but all data including the subset can be maintained by the Home Office; or (3) a subset of selected data files at the Home Office is made available to the remote site for inquiry purposes only.

An additional feature of the present system is a means for searching the data files under various topics such as agent maintenance, or policy administration. The system is designed to search for a particular agent or client in different ways: by number, by phonetic name, by taxpayer I.D., by alphabetical listing, and by external number. The system also has the ability to search partial names and numbers.

An additional feature of the invention is the method by which the functions described above are processed by the system. The previously described mechanism for updating current data in response to entered data and received data from the PC's includes an activity server/activity processor mechanism which processes certain functions immediately as on line transactions and queue's additional functions in an order preset by the system or by the user as required. The processing mechanism analyzes the entered and received data, identifies which function is to be performed and prioritizes that function for processing.

The system further includes a mechanism for providing a retrievable audit history of every function and every transaction performed by the system and all data entered into the system. The audit history is retrievable by date and time, person performing the function and transaction type. The aforesaid correspondence mechanism includes means for identifying and retrieving correspondence on the basis of policy level, the individual agency level, the general agency level, the document type or the zip code as required.

A copy of the option structure used in the program is attached hereto and incorporated by reference herein. Additionally, the materials filed with the original application including the microfiche copy of the program is attached hereto and microfiche copy of a users manual for the program are incorporated by reference herein.

I claim as my invention:

1. An integrated system for the real time administration of an organization, said system comprising:
   a plurality of networked computers;
   at least one of said computers comprising an activity processor;
   at least one of said computers comprising an activity scheduler;
   at least one file server operatively connected to said networked computers;
   means for real time performance of a plurality of functions relevant to administration of said organization;
   manual entry means for entering data relative to any of said functions;
   data receiving and verifying means for receiving and verifying data from any of said networked computers, against said manual entry means and at least one predetermined standard;
   means responsive to said entered data and received data for real time updating of said data across said network of computers relative to any of said functions when desired;
   data storage means for storing data;
   display means for displaying any of said data;
   means for predefining via said activity scheduler relative to said entered data that selected first types of entered data are to be processed by said activity processor in real time and that selected second types of said entered data are to be queued for processing at another time;
   menu driven means for defining a product in response to menu selections made by a user; and
   menu driven means for receiving a request into said network of computers by displaying via said display means screens that vary depending upon said request.

2. The system of claim 1 and further comprising means for generating a series of questions to the user, and means for modifying the operation of said system to globally conform to the answers to said questions.

3. The system of claim 2 and further comprising means defining four levels, said levels comprising:
   a database level;
   a company level;
   a product line level, and
   a product level, each said level comprising a series of parameters which may be selectively modified by the user, said system including means for modifying said parameters at the command of the user and means responsive to said modifying means for modifying said levels independently or collectively as required.

4. The system of claim 3 wherein said database level comprises all information stored in said data storage means.

5. The system of claim 3 wherein said company level comprises all data relating to a single corporate entity.

6. The system of claim 3 wherein said product line level comprises menu based generation of the parameters of a product line including products and services.

7. The system of claim 3 wherein said product level comprises a plurality of individual forms defining said product.

8. An integrated system for the real time administration of an organization,
   said system comprising:
   a plurality of networked computers;
   at least one of said computers comprising an activity processor;
   at least one of said personal computers comprising an activity scheduler;
   at least one file server operatively connected to said network;
   means for real time performance of a plurality of predetermined functions;
   manual entry means for entering data relative to any of said functions;
   data receiving and verifying means for receiving, verifying and updating data from any of said computers, said manual entry means and said at least one file server against at least one predetermined standard;

means responsive to said entered data and received data for real time updating data relative to any of said functions when desired;

data file means for storing data;

display means for displaying any of said data;

means for predefining via said activity scheduler that selected first types of entered data are to be processed by said activity processor in real time and that selected second types of entered data are to be queued for processing at another time;

display means for displaying any of said data;

menu driven means for defining a product in response to menu selections made by a user;

menu driven mean for receiving an application for said product into said network by displaying, via said display means, screens that vary depending upon said selected product;

means for providing a retrievable audit history of every function processed by said system, said audit history at least retrievable by date, time and transaction type;

means for defining a hierarchy of sales agents comprising who each sales agent reports to and who reports to each sales agent, said means selectively defining thereby a corresponding hierarchy for each product;

means for real time calculation of commissions for sales agents based on where an agent is in said hierarchy;

means for the real time reversal of any transaction;

means for changing a sales agent's commission when a relevant transaction is reversed;

means for calculating commission tax information; and means for printing a commission tax form.

9. A system for administering an organization comprising:

a plurality of networked computers including at least one computer comprising an activity processor, at least one of said computers comprising an activity scheduler, where each of the computers has:

input means for inputting data, data storage means for storing data, display means for displaying said data, manual entry means for defining administrative functions of said organization, means for real time performance of a plurality of functions relevant to said administrative functions of said organization, and data receiving and verifying means for receiving and verifying data from any of said computers against said manual entry means and said at least one file server against said defined administrative function;

at least one computer comprising a file server;

means responsive to said entered data and received data for real time updating of said data relative to said defined administrative functions when desired;

means for predefining via said activity scheduler relative to said entered data that selected first types of entered data are to be processed by said activity processor in real time and that selected second types of said entered data are to be queued for processing at another time;

menu driven means for defining a product in response to menu selections made by a user; and menu driven means for receiving a request into said network by displaying via said display means screens, that vary depending upon said request.

10. The system of claim 9 and further comprising means for generating a series of questions to the user; and means for modifying the operation of said system to globally conform to the answers to said questions.

11. The system of claim 9 and further comprising means defining four levels, said levels comprising a database level, a company level, a product line level and a product level, each said level comprising a series of parameters configured to be modified by the user, said system including means for real-time modification of said parameters at the command of the user and means responsive to said real time modification means for real time modification of said levels independently or collectively as required.

12. A system for administering an organization comprising:

a plurality of networked computers, at least one member of said plurality of networked computers including an activity processor, at least one member of said plurality of networked computers including an activity scheduler, and at least one member of said plurality of networked computer including a file server, said plurality of networked computers having:

input means for inputting data, data storage means for storing data, display means for displaying said data, manual entry means for defining administrative functions of said organization, means for real time performance of a plurality of functions relevant to said administrative functions of said organization, and data receiving and verifying means for receiving and verifying data from any of said computers against said manual entry means and said at least one file server against said defined administrative function;

means responsive to said entered data and received data for real time updating of said data relative to said defined administrative functions when desired;

means for predefining via said activity scheduler relative to said entered data that selected first types of entered data are to be processed by said activity processor in real time and that selected second types of said entered data are to be queued for processing at another time;

menu driven means for defining a product in response to menu selections made by a user; and menu driven means for receiving a request into said network by displaying via said display means screens, that vary depending upon said request.

* * * * *